United States Patent [19]

Kihara

[11] 3,997,917

[45] Dec. 14, 1976

[54] CARD HANDLING APPARATUS

[75] Inventor: Nobutoshi Kihara, Tokyo, Japan

[73] Assignee: Sony Corporation, Tokyo, Japan

[22] Filed: Mar. 21, 1975

[21] Appl. No.: 560,875

[30] Foreign Application Priority Data

Apr. 1, 1974 Japan .............................. 49-36855

[52] U.S. Cl. ......................... 360/88; 235/61.11 D; 340/149 A; 360/2; 360/73

[51] Int. Cl.² ................... G11B 5/80; G11B 25/04; G11B 19/18; G06K 7/08

[58] Field of Search ............. 360/88, 2, 71, 73–74; 340/149, 149 A; 235/61.11 D, 61.12 M

[56] References Cited

UNITED STATES PATENTS

| | | | |
|---|---|---|---|
| 3,075,194 | 1/1963 | Gray | 360/2 |
| 3,602,643 | 8/1971 | Wright, Jr. | 340/149 A |
| 3,745,839 | 7/1973 | Ramstetter | 340/149 A |
| 3,787,661 | 1/1974 | Moorman et al. | 360/2 |
| 3,866,827 | 2/1975 | Obata et al. | 235/61.11 D |

*Primary Examiner*—Alfred H. Eddleman
*Attorney, Agent, or Firm*—Lewis H. Eslinger; Alvin Sinderbrand

[57] ABSTRACT

A card handling apparatus for a teaching machine is operable manually by an operator to load or feed a teaching card in a forward direction at any desirable high speed and to return the card at a predetermined constant speed to record or reproduce an audio information on or from the card without any undesirable wow or flutter.

As the card is manually fed or loaded in a forward direction, the energy for returning the card in a backward direction is charged in a spring means and hence less electric power for operating the apparatus is required.

5 Claims, 7 Drawing Figures

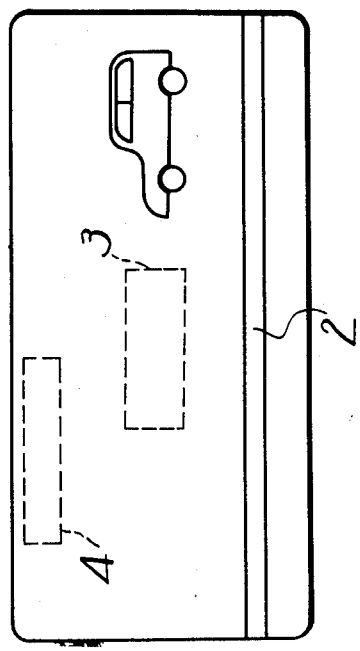
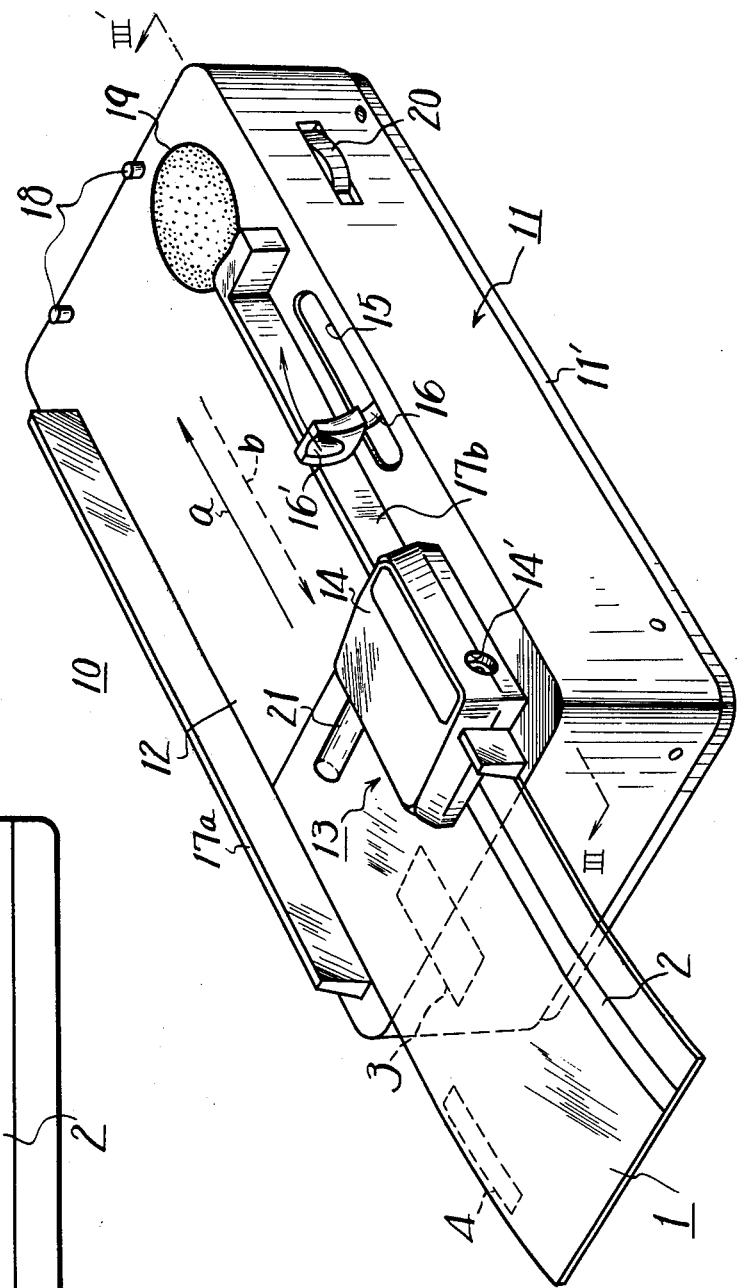

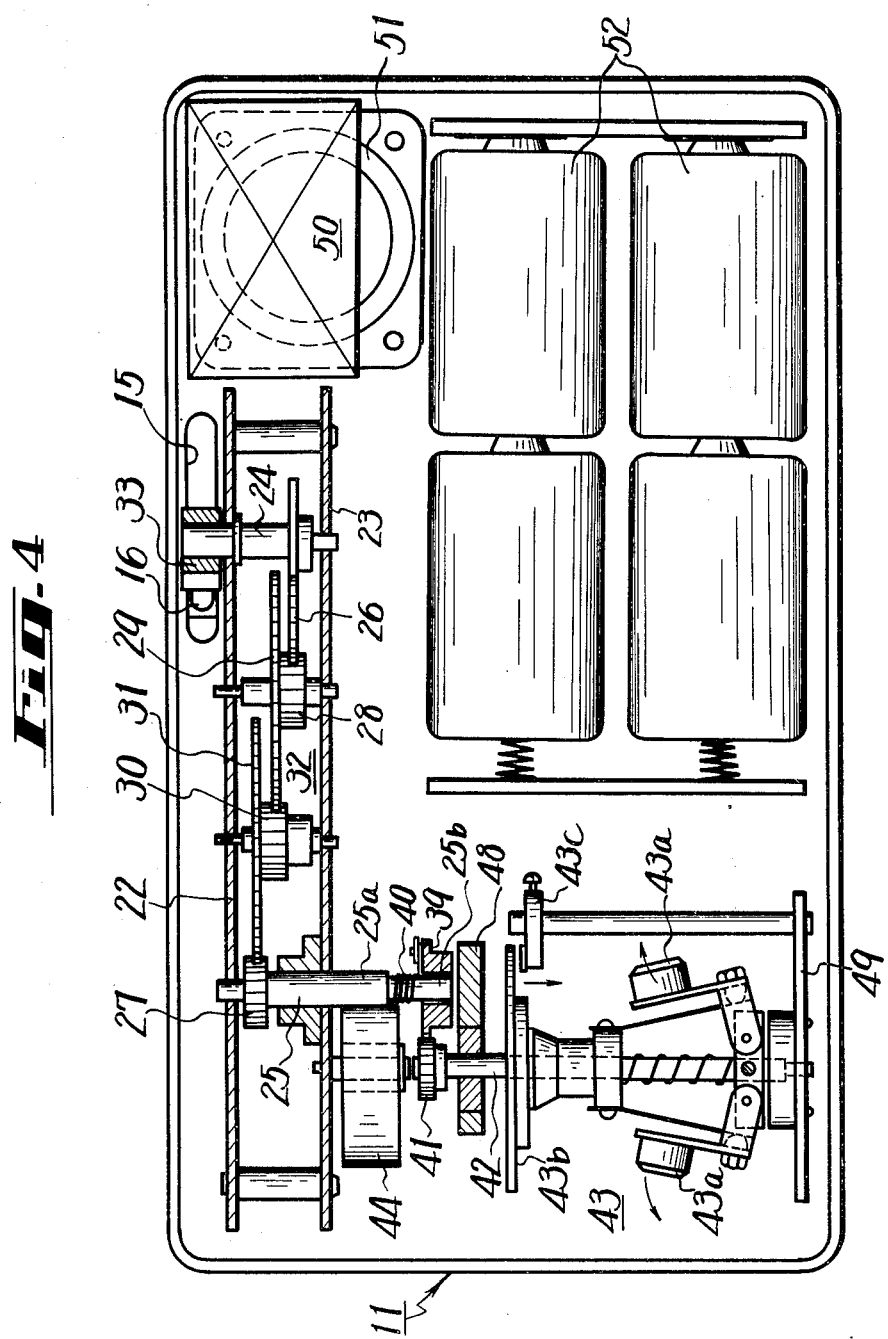

CARD HANDLING APPARATUS

BACKGROUND OF THE INVENTION

1. Field of the Invention

This invention relates to teaching machines for use in language laboratories and the like, and which are capable of recording and reproducing a sound on and from an information card, and more particularly to improvements in a card handling apparatus operable to feed or load the card in a forward direction at any desirable speed and to return the card at a predetermined constant speed to record or reproduce the information on the card.

2. Description of the Prior Art:

Prior art apparatus of this kind have many problems. In some existing types thereof, the card handling apparatus is complicated in construction and large in size. Besides, there are operational and functional defects, such as, the inability to achieve partial repeat reproduction from the teaching card, or, in a proposed the manual system of simple type, the inability to obtain the proper contact pressure of a head block against a magnetic recording band or stripe provided on the card and/or the inability to transport the head block along the surface of the recording band at a constant speed.

Further, in an existing card handling apparatus of this kind, motor power is employed when the card is loaded or fed to a position from which the recording or reproducing of this apparatus is started, so that quick loading is impossible.

SUMMARY OF THE INVENTION

In the card handling apparatus according to this invention, after a card is laid on the apparatus and inserted between a head assembly and a capstan roller, a card loading lever is manually shifted in one direction to rotate the capstan roller through a reduction gear and thus the card can be loaded to be fed to the recording or reproducing position at any desired speed. Then, the loading lever is released to return the card from the recording or reproducing starting position card by spring power or motor power at a predetermined constant speed and hence the recording or reproducing operation is possible without any wow or flutter. In a preferred embodiment of this invention, the card is returned only by power charged in a spring means during the manual loading operation and no motor is employed for effecting the loading and returning (unloading) movements. In this case, electric power is consumed only for the recording and reproducing amplifying system and hence the consumption of energy stored in a battery can be minimized.

Consequently, if the card handling apparatus according to this invention is used as a reproducing apparatus for language instruction, all the necessary operations can be achieved by a single loading lever. Particularly, it will be noteworthy that the quick loading and repeat reproduction can be simply achieved.

As described above, the card handling apparatus of this invention has a simple construction in addition to many advantages mentioned above, so that the apparatus can be made small in size and also is suitable for mass production at low cost. Accordingly, an operator can enjoy many conveniences, and when a battery is used as a power source, it is easy to carry the same for use in remote places. Accordingly, this invention has a great number of practical merits.

Therefore, it is a principal object of the present invention to provide a simple and reasonable card handling apparatus which avoids the problems of the prior art mentioned above.

It is another object of the present invention to provide a card handling apparatus for a teaching machine in which the card can be quickly fed or loaded to any desired position from which the card is returned to record or reproduce the information on or from the card.

It is a further object of the present invention to provide a card handling apparatus for a teaching machine in which the card can be manually fed or loaded in the machine at any desired speed and is returned at a predetermined speed so as to record or reproduce the information on or from the card.

It is still another object of the present invention to provide a card handling apparatus for a teaching machine in which a signal recording and/or reproducing head is brought into contact with the card at a predetermined pressure during the operation of the apparatus.

The above, and other objects, features and advantages of the present invention, will be apparent from the following description taken in conjunction with the accompanying drawings.

BRIEF DESCRIPTION OF THE DRAWINGS

FIG. 1 is a plan view showing one example of a teaching card,

FIG. 2 is an exterior perspective view showing one example of a card handling apparatus according to the present invention, FIG. 4 is a bottom plan view showing the inside of the apparatus housing.

DESCRIPTION OF THE PREFERRED EMBODIMENTS

Figure 3A:
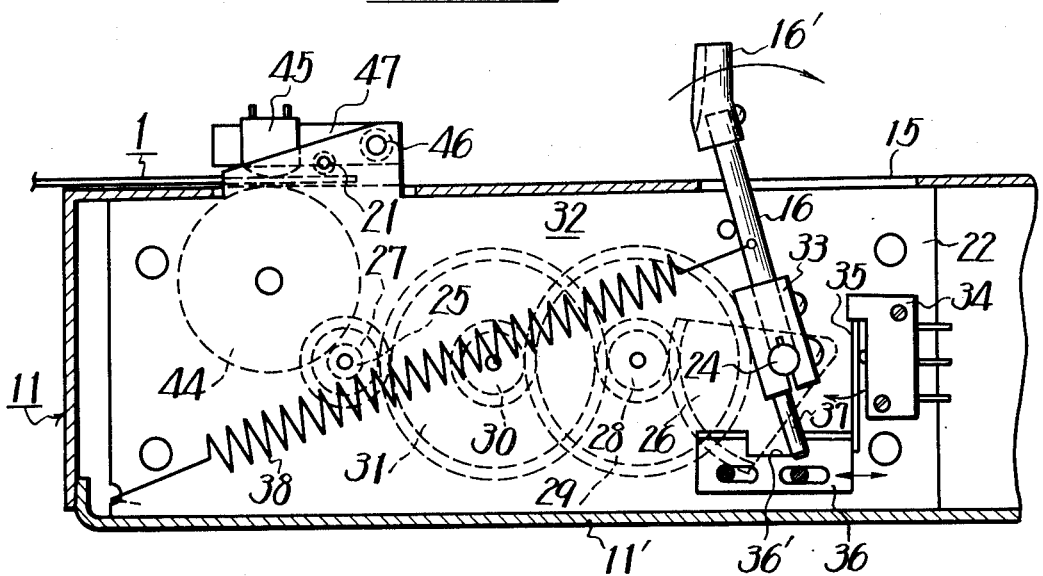
FIGS. 3A and 3B are longitudinal-sectional views of a main part of the apparatus taken along a line III-III' on FIG. 2.

In FIG. 1, there is shown a rectangular teaching card 1 made of relatively hard paper on which a thin magnetic film is disposable in the form of a band 2 (hereinafter referred to as a magnetic band) having a predetermined width and which is formed parallel with one longitudinal side of the card. The card may bear a picture of an object or activity, and the words therefor in a foreign language to be learned, its translation and the like are printed on the card at other spaces 3 and 4. In general, the standard pronunciation of the foreign language 3 is recorded on the magnetic band 2 in advance so that a student can learn both visually and orally. Teaching cards of the described type and a teaching machine or a language laboratory as its reproducing means are already well-known.

Referring now to FIG. 2, it will be seen that a card handling apparatus 10 of this invention, includes a housing 11 of substantially rectangular configuration, with the upper surface of the housing 11 forming a card transporting base or surface 12 over which the teaching card 1 is quickly loaded in the forward direction indicated by solid line arrow a and then returned from a predetermined loading position in the backward or return direction indicated by broken line arrow b at a constant speed so that, during such return movement, a voice signal previously recorded on the magnetic band 2 is adapted to be reproduced.

A head assembly 13 is provided at the front right corner on the card transporting base 12, and includes at least a reproducing magnetic head disposed inside a cover 14 so as to be in slidable contact with the magnetic band 2 of the teaching card 1. If erasing and recording-reproducing heads are included in the head assembly 13, it is of course possible to perform recording and reproducing operations.

In the card handling apparatus 10 of this invention, the quick loading of the teaching card 1 onto the card transporting base 12, its returning movement at a constant speed, a reproducing operation during its returning movement, on-off operation of an electric circuit unit to be described later and the like are respectively achieved by actuation of a single lever. In the illustrated example, for example, an elongated aperture 15 is formed in the upper surface 12 near the right side of the housing 11 and through which a card loading lever 16 is projected so that the above described operations may be achieved merely by shifting a knob 16' on the loading lever 16 in the direction indicated by the arrow.

As shown on FIG. 2, guide rails 17a and 17b are provided for guiding the teaching card 1 at its right and left edges along the card transporting base 12. Further, two projections 18 extend from the surface or card transporting base 12 for defining the position of the rear edge of the teaching card 1 after being completely loaded. A volume control knob 20 extends from a side of housing 11. A card guide shaft 21 is provided to contact the surface of the teaching card 1 so as to hold the rear edge portion of the teaching card 1 when its major portion is moved off the card transporting base 12, as illustrated, and to maintain proper contact of the head with magnetic band 2. The card guide shaft 21 also serves to prevent the card from being raised during the loading and reproducing operations. The housing 11, the guide rails 17a and 17b, the projections 18 and the like can be integrally molded of a light alloy or a synthetic resin. The cover 14 of the head assembly 13 is composed of, for example, a molded resin and is attached to the guide rail 17b by a set screw 14'.

Figure 3B:
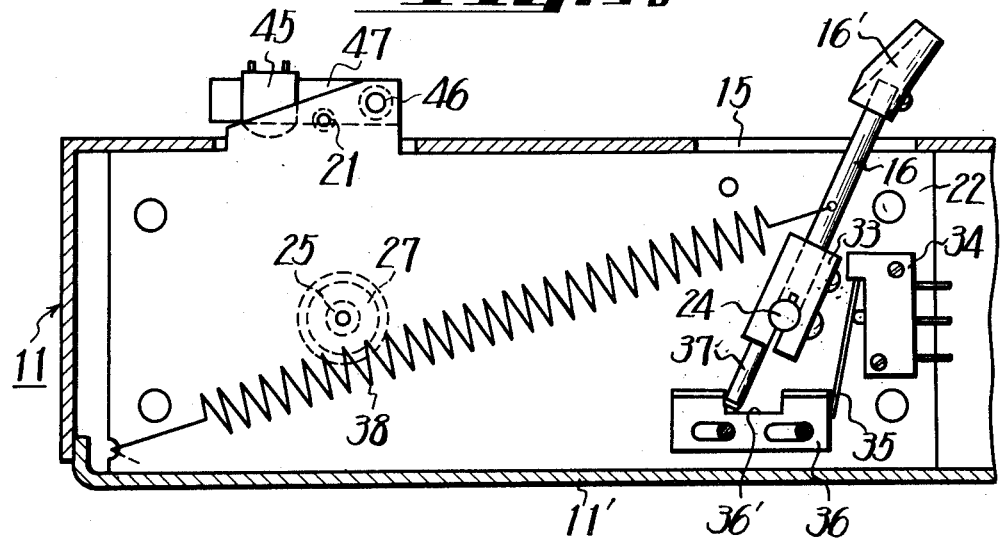

Referring now to FIGS. 3A, 3B and 4, it will be seen that, in the illustrated embodiment of the invention, a pair of parallel, spaced apart frame plates 22 and 23 extend longitudinally inside the housing 11 adjacent the side of the loading lever 16. A first rotary shaft 24 and a second rotary shaft 25 are arranged parallel to each other and journalled in the rear and front portions of the frame plates 22 and 23, respectively (FIG. 4). The first rotary shaft 24 has fixed thereto a sector gear 26 while the second rotary shaft 25 has fixed thereto a pinion 27, and there is interposed therebetween a gear train 32 consisting of a pinion 28 in mesh with the sector gear 26, a gear 29 formed integral with the pinion 28, a pinion 30 in mesh with the gear 29 and a gear 31 integral with the gear 30 and in mesh with the pinion 27. Thus, a rotary system is provided with a certain speed-up ratio from the first rotary shaft 24 to the second rotary shaft 25. An end of the first rotary shaft 24 projects outside of the frame plate 22, and the loading lever 16 is fixed to this projected end of the shaft through a holding member or clamp 33, as shown in FIG. 3A.

In FIG. 3A, reference numeral 34 denotes a microswitch for controlling an electric circuit consisting, for example, of a battery source, a circuit unit and a magnetic head. The microswitch 34 is mounted on the frame plate 22 adjacent to the first rotary shaft 24 and is provided with a resilient actuating member 35 which is biased to the position shown on FIG. 3B for closing or turning ON the microswitch 34.

In the illustrated embodiment, a sliding plate 36 is provided so as to be in contact with the free end of the resilient actuating member 35 of the microswitch 34 and is suitably connected with the loading lever 16 (or the first rotary shaft 24) so that the microswitch 34 is turned on at a predetermined position of the loading lever 16 in the course of the movement of the latter in the loading direction or the forward direction (refer to FIG. 3B) and the microswitch is turned OFF when lever 16 is returned to its initial or rest position (FIG. 3A). In a practical example, the sliding plate 36 is in frictional sliding engagement with the surface of the frame plate 22 so as to be movable relative to the latter through a stroke and the upper edge portion of the sliding plate 36 is provided with a recess 36' of a predetermined length and with a flange extending from the opposite ends of such recess. A projecting rod 37 extends from the holding member or clamp 33 and engages in the recess 36' to shift sliding plate 36 right and left so that the microswitch 34 may be turned OFF and ON, respectively, only as lever 16 nears its rest position (FIG. 3A) and its loaded position (FIG. 3B).

A helical or main spring 38 with properly selected wire diameter, coil diameter, number of turns, and length is connected between the frame plate 22 and of the loading lever 16 to bias the latter in the counterclockwise direction about the first rotary shaft 24, while manual displacement of the loading lever 16 in the loading or forward direction shown by the arrow a in FIG. 1 from the position shown in FIG. 3A is effective to charge or tension the main spring 38 with such tension or energy stored in the spring 38 being effective, when lever 16 is thereafter released, to drive the gear train 32.

In FIG. 4, the second rotary shaft 25 is shown to have a large diameter portion 25a projecting from frame plate 23 and provided with a small diameter portion 25b at its free end. The small diameter portion 25b is slidably engaged in a clutch gear 39. The clutch gear 39 is made to rotate with the second rotary shaft 25 when the latter rotates in a clockwise direction as viewed from the side of the pinion 27, while the clutch gear 39 slips relative to the second rotary shaft 25 when the latter is rotated in the counterclockwise direction. Such unidirectional coupling of the clutch gear 39 to shaft 25 may be effected in various ways. In this example, however, a left winding coiled spring 40 is wound about the small diameter portion 25b with one end thereof being fixed to the gear 39 and with the other end thereof being butted against the stepped portion or end surface of the large diameter portion 25a to perform the above described function.

The gear 39 is meshed with a pinion 41 on a shaft 42, and a speed regulator 43 of, for example, the centrifugal type, is provided on shaft 42 so as to control the speed of the clockwise rotation of the second rotary shaft 25. It is needless to say that such known centrifugal speed regulator is only an example of the devices that can be employed to control the speed of such rotation of shaft 25. The illustrated centrifugal speed regulator 43 is shown to include two pivoted weights 43a which rotate with shaft 42 and control the axial position of the brake disc 43b relative to a fixed brake shoe or damper 43c.

As will be substantially obvious from the description with reference to FIGS. 3A, 3B and 4, when the loading lever 16 is manually shifted in the loading direction, the second rotary shaft 25 may be rotated at a high speed in the counterclockwise direction through the sector gear 26, gear train 32 and pinion 27 to charge the main spring 38 with the above-mentioned tension. During such rotation of shaft 25, clutch gear 30 slips relative thereto, so that speed regulator 43 is inoperative. However, during the return movement of the loading lever 16 by the charged spring 38, the speed regulator 43 is associated with the rotary system, and hence the loading lever 16 is slowly returned and particularly the second rotary shaft 25 is smoothly rotated at a constant speed without being affected by the tension variation of the main spring 38. In other words, the quick loading of the teaching card 1 as described in FIG. 2 and the returning thereof at a constant speed from the loading position are performed directly by the second rotary shaft 25 or indirectly through a capstan roller which will be later described.

Figure 5:
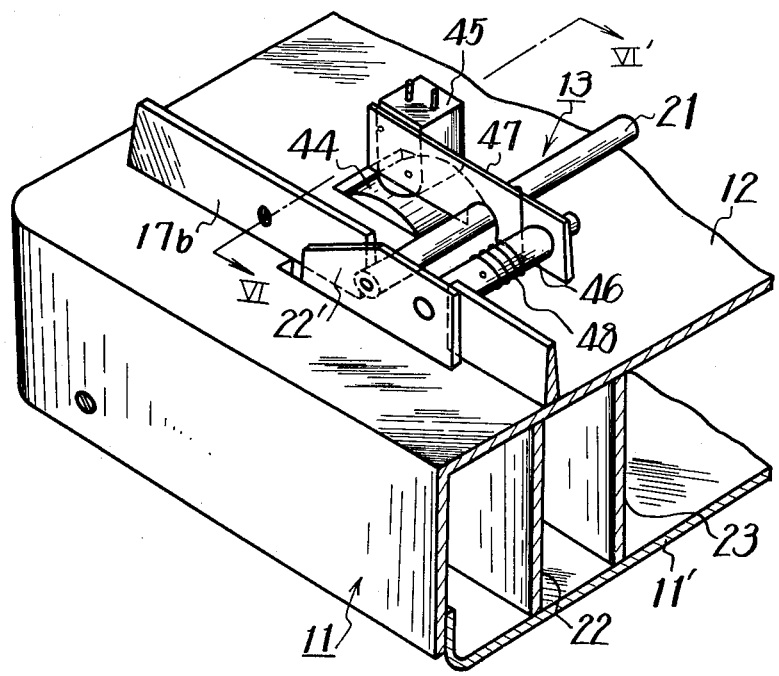
FIG. 5 is a detail perspective view showing the mounting of the assembly.
Figure 6:
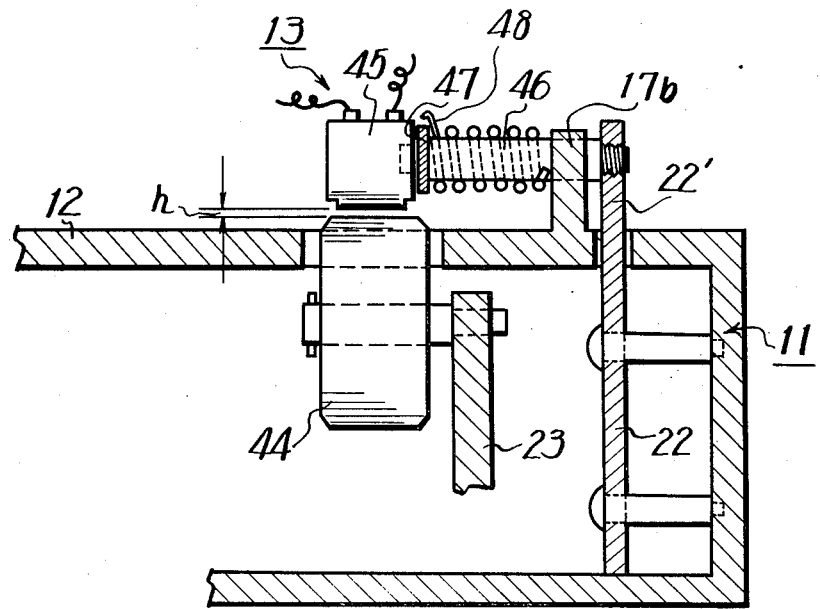
FIG. 6 is a detail cross-sectional view taken along the line VI-VI' on FIG. 5.

However, the means for rotating the second rotary shaft 25 at a constant speed is not always limited to the construction described above. It is also possible that a small low-speed motor or the like is disposed in place of the speed regulator 43 and its motor shaft is attached to pinion 41. In this case, of course, the main spring 38 is also not necessary. With such an arrangement, when the microswitch 34 is turned ON in response to movement of the loading lever 16 to a predetermined position in the loading or forward direction, that is, to the position shown in FIG. 3B, electric power is also supplied to the mentioned electric motor, whereas the supplying of power to the motor is discontinued when lever 16 returns to the position shown in FIG. 3A so that the quick loading of the teaching card 1 and its transportation in the backward or return direction with a constant speed can be achieved. However, since the quick loading of the teaching card 1 is attained by manipulation of the loading lever 16, the speed-up rotary system between the first and second rotary shafts 24 and 25, the aforesaid unidirectional clutch 39 are still required. In the case of this embodiment, as depicted in FIGS. 4, 5 and 6, there is provided a capstan roller 44 made of, for example, a synthetic rubber, to be frictionally driven by the large diameter portion 25a of the second rotary shaft 25. The peripheral surface of the capstan roller 44 extends through an opening in the card transporting base 12 of the housing 11 and a reproducing magnetic head 45 housed in the head assembly 13 (refer to FIG. 1) is urged downwardly into contact with a card 1 on the peripheral surface of the roller 44.

A construction for holding the magnetic head 45 will be next described. For example, the frame plate 22 is extended upwardly to form a mounting plate 22' which is projected through the transporting base 12 at the outside of the guide rail 17b. A head supporting rod 46 extends from the mounting plate 22' in parallel with the guide shaft 21 and the free end portion of this rod 46 is of reduced diameter. A head support arm 47 is pivoted at one end on such reduced diameter end portion of rod 46 and is biased downwards by a helical spring 48 or the like, while the magnetic head 45 is mounted at the other end portion of the supporting arm 47 as illustrated. It will be apparent from the above description that the teaching card 1 is inserted between the magnetic head 45 and the capstan roller 44 so as to be driven by the latter during the loading and the constant-speed returning operations. In the illustrated example, the guide shaft 21 also serves as a stop to limit the downward movement of the supporting arm 47 and the capstan roller 44 is journalled in a portion of the frame plate 23.

The distance h (FIG. 6) between the capstan roller 44 and the head 45 determined by engagement of arm 47 with shaft 21 is smaller than the thickness of the card 1 so that roller 44 and head 45 are not in contact with each other when no card 1 is inserted therebetween to prevent the capstan roller 44 from being deformed.

In FIGS. 3A, 3B and 5, reference numeral 11' indicates a bottom of the housing 11, and in FIG. 4 reference numeral 48 designates a bearing plate for the pinion shaft 42, 49 a regulator holding plate, 50 a circuit unit, 51 a speaker and 52 indicates batteries accommodated in the housing 11. The driving voltage source is not limited to a battery or batteries and, for example, an external AC voltage source can be used.

The construction of the described embodiment and the operations of the respective elements are already apparent. Now, a description will be given of the operation of the card handling apparatus as a whole.

With the leading end portion of the card 1 placed on the card transporting base 12 of the housing 1, if the loading lever 16 is pivotally moved in the direction of the arrow a on FIG. 2, the teaching card 1 is quickly loaded in the direction of arrow a, that is, in the forward direction, until its end edge abuts to cause its rear edge portion to butt with the projections 18 and simultaneously the microswitch 34 is turned ON (refer to FIG. 3B). At this time, lever 16 is released and the teaching card 1 starts its constant speed returning movement in the direction of arrow b. During such return movement, a signal representing, for example, the word "car", pronounced in the foreign language written at 3, is picked up by the magnetic head 45 in slidable contact with the magnetic band 2 and is applied through circuit unit 50 to the speaker 51 so as to be audibly reproduced. Thus, an operator or student can practice the pronunciation while viewing the corresponding words printed at 3 and 4 on the teaching card 1.

The teaching card 1 is designed to have a transporting speed of about 4 cm per second during reproduction, and the magnetic band 2 may be recorded with several repeat pronunciations, a pronunciation with its simple explanation or the like.

During the reproducing process, the loading lever 16 is being slowly returned as mentioned above. Accordingly, when the operator listens to a reproduced voice and wants to reproduce again the same voice as occasion demands, it can be simply repeated by again urging the loading lever 16 in the loading direction from any position in the returning process. The operation to turn off the microswitch 34 at the returning position of the loading lever 16 is as already described above.

However, as has been mentioned above, the card handling apparatus according to the present invention is not limited to use in a language laboratory apparatus. It is also possible that various kinds of figures or the like may be displayed on a teaching card with its magnetic band being recorded with voices explaining the same, so that the reproduction of such recorded voices will serve to provide for good understanding of the displayed figures or the like. If the apparatus according to this invention is provided with both the recording and reproducing functions, the convenience and scope of its possible use will be enhanced.

It is also apparent that an optical means may be used in the recording or reproducing system. In the case when such a recording system is used, the characteristic of the sheet material used for the teaching card is selected properly and, for example, a projection device is provided in the card handling apparatus. With such an arrangement, as the figures including pictures, photographs or the like on the teaching card are projected on a screen, voices explaining the projected pictures are reproduced.

In the above described embodiment, the loading lever 16 is in the form of a pivotally movable lever. However, it is also possible to use a so-called slide lever. In that case, a rack is attached to the slide lever to drive the speed-up rotary system 32. Further, in the illustrated embodiment, the card is held against the capstan roller 44 by the head 45, but it is also possible to provide a pinch roller to transport the card by being inserted between the capstan and the pinch roller.

It will be apparent that a number of changes and variations can be effected without departing from the scope of the novel concepts of the present invention.

I claim as my invention:

1. An apparatus for recording and/or reproducing information signals in a record track extending parallel with an edge of a rectangular card, comprising:
   means defining a card supporting surface with guides thereon for guiding a card in movement over said surface in forward and return directions parallel to said edge of the card;
   transducer means positioned to scan the record track on a card during said movement of the latter;
   a capstan roller engageable with a card on said surface for driving the card in said forward and return directions in response to rotation of said capstan roller in a first direction and a second direction, respectively;
   a reciprocating actuating member movable manually in one direction;
   spring means connected with said actuating member and being loaded in response to movement of the latter manually in said one direction to provide motive power for movement of said actuating member in the opposite direction when said actuating member is released;
   gear means connecting said actuating member with said capstan roller for rotating the latter in said first direction at any desired speed in response to the manual movement of said actuating member in said one direction and for rotating said capstan roller in said second direction in response to the movement of the actuating member in said opposite direction by said spring means;
   speed regulating means for establishing a substantially uniform predetermined speed of rotation of said capstan roller only in said second direction; and
   switch means responsive to the position of said actuating member for causing operation of said transducer means only during the return movement of a card by the rotation of said capstan roller in said second direction at said predetermined speed.

2. An apparatus according to claim 1; in which said actuating member is a pivotally mounted lever arm.

3. An apparatus according to claim 1; in which said speed regulating means is coupled with said gear means through one-way clutch means so as to be operative only during the rotation of said capstan roller in said second direction.

4. An apparatus according to claim 1; in which said capstan roller and said transducer means are disposed in opposed relation for the passage of a card therebetween, said transducer means is mounted for movement toward and away from said capstan roller and is resiliently urged toward the latter, and stop means are provided for limiting the movement of said transducer means toward said capstan roller with a gap therebetween smaller than the thickness of the card.

5. An apparatus according to claim 1; in which said switch means has an ON condition for causing operation of said transducer means and an OFF condition for rendering said transducer means inoperative, a slide member is movable between first and second positions corresponding to said ON and OFF conditions, respectively, of said switch means, said slide member is frictionally held against movement between said first and second positions thereof, and lost-motion connection means is provided between said actuating member and said slide member to displace the latter to said first position thereof at the conclusion of the manual movement of said actuating member in said one direction and to return said slide member from said first position to said second position thereof at the conclusion of the movement of said actuating member in said opposite direction by said spring means.

* * * * *